Figure 1:
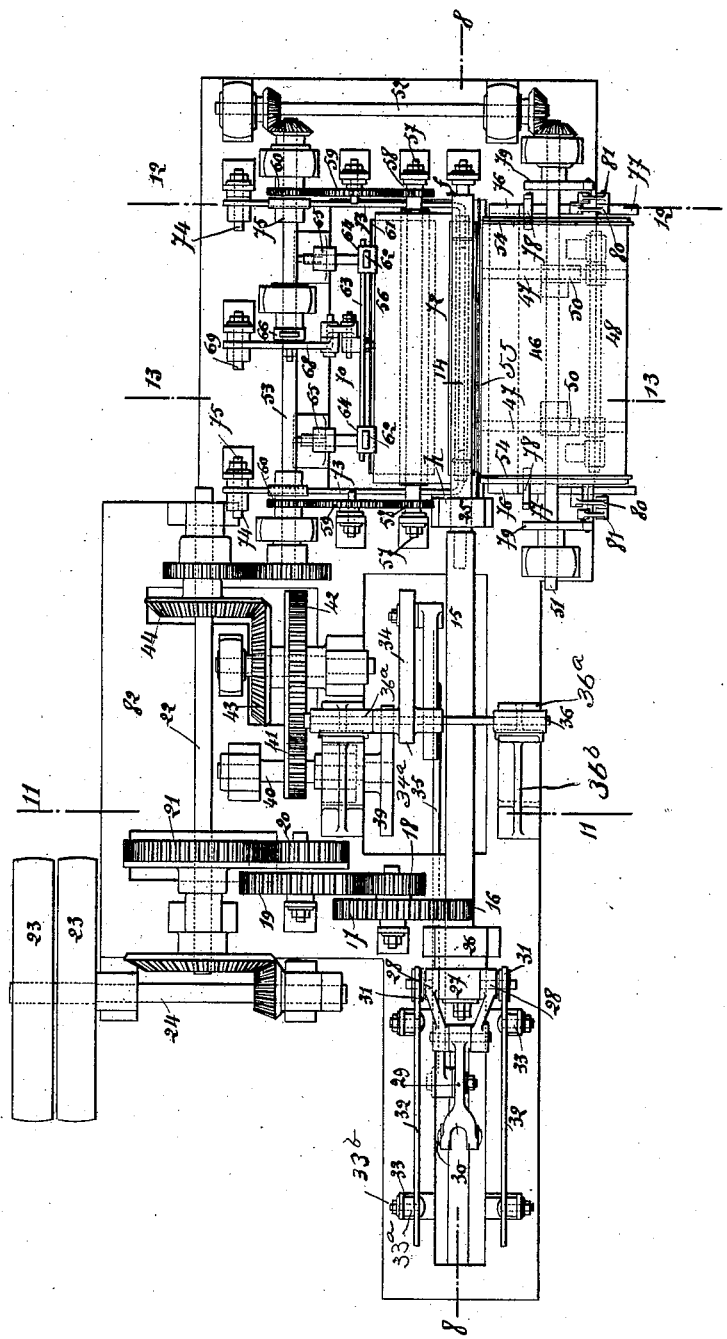

No. 678,479. Patented July 16, 1901.
C. FREROT.
MACHINE FOR MAKING PAPER TUBES.
(Application filed June 8, 1900.)
(No Model.) 3 Sheets—Sheet 1.

Witnesses:
C. Holloway
W. E. Pinckney

Inventor:
Charles Frerot,
By J. E. M. Bowen
Attorney.

No. 678,479. Patented July 16, 1901.
C. FREROT.
MACHINE FOR MAKING PAPER TUBES.
(Application filed June 8, 1900.)
(No Model.) 3 Sheets—Sheet 2.
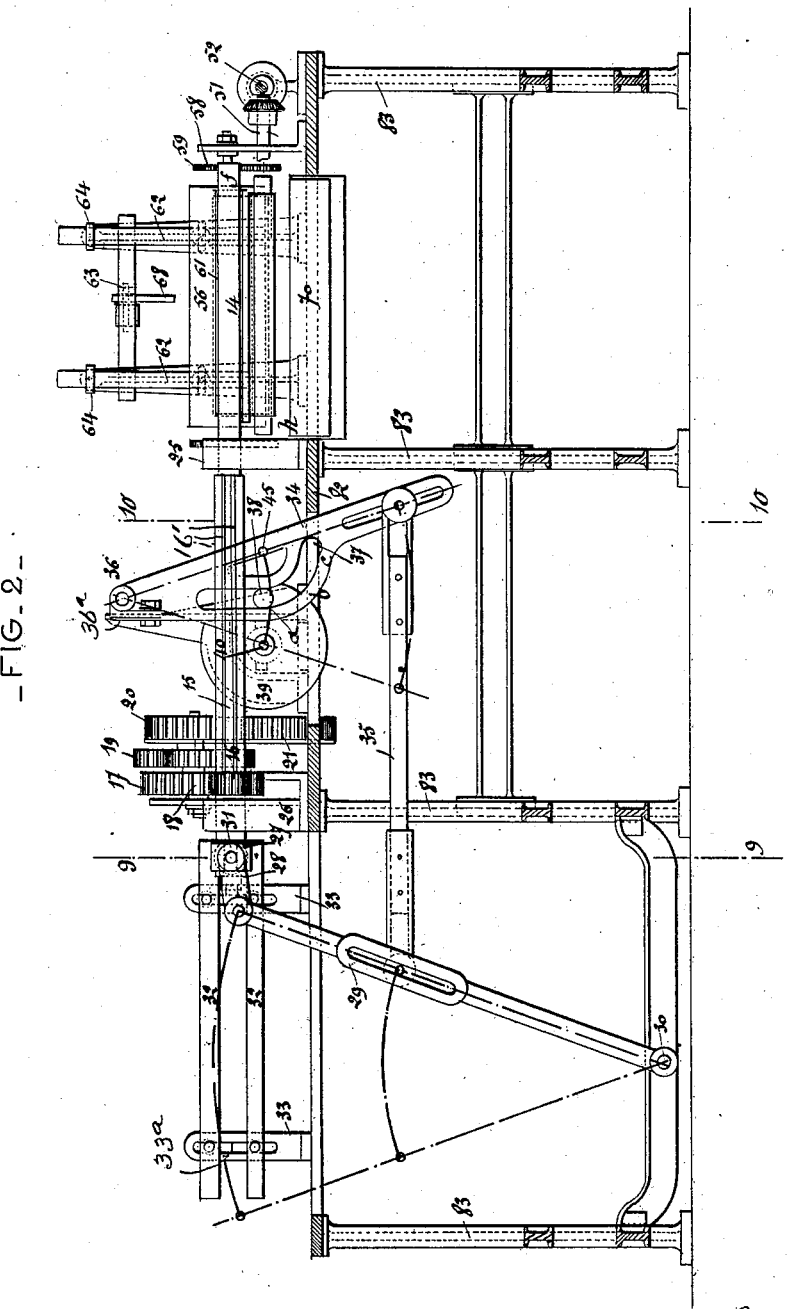
Witnesses:
C. Holloway
W. C. Pinckney
Inventor:
Charles Frerot,
By J.E.M.Owen
Attorney

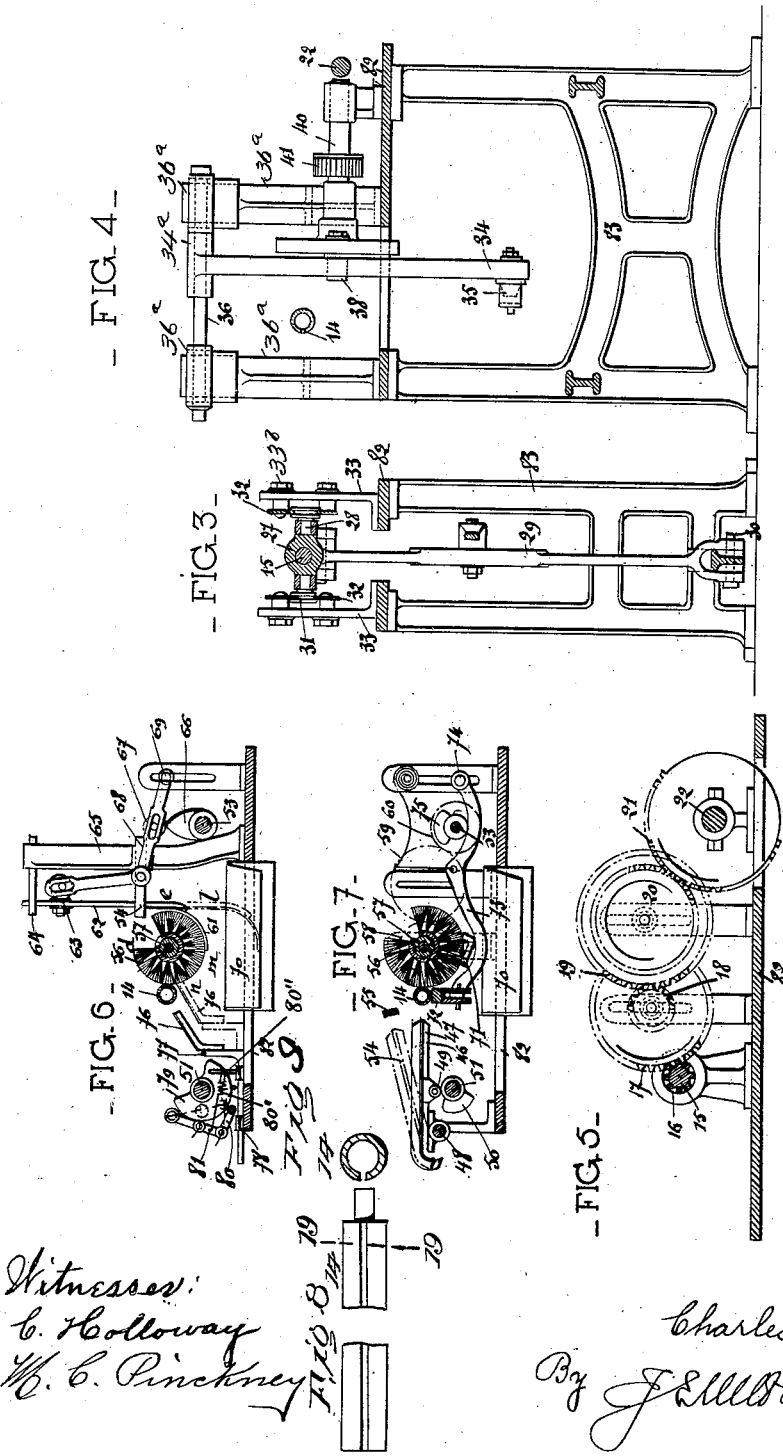

UNITED STATES PATENT OFFICE.

CHARLES FREROT, OF RHEIMS, FRANCE.

MACHINE FOR MAKING PAPER TUBES.

SPECIFICATION forming part of Letters Patent No. 678,479, dated July 16, 1901.

Application filed June 8, 1900. Serial No. 19,524. (No model.)

*To all whom it may concern:*

Be it known that I, CHARLES FREROT, manufacturer, a citizen of the Republic of France, residing at Rheims, (Marne,) France, have invented a certain new and useful Machine for Manufacturing Cylindrical Tubes of Paper, Cardboard, or Pasteboard, of which the following is a specification.

My invention relates to that kind of machines by which cylindrical tubes of paper, cardboard, or pasteboard are manufactured in a half automatical way; and its object is a machine which when the sheets of paper, cardboard, or pasteboard, cut up beforehand to the size desired, are placed one after another into the machine rolls, glues, and turns them out as finished tubes. I attain this object by the mechanism illustrated in the accompanying drawings, in which—

Figure 1 is a top view of the entire machine. Fig. 2 is a vertical section of the frame of the same through the line 8 8 of Fig. 1, the working parts being shown in elevation. Fig. 3 is a cross-section through the line 9 9 of Fig. 2. Fig. 4 is a cross-section through the line 10 10 of Fig. 2. Fig. 5 is a cross-section through the line 11 11 of Fig. 1. Fig. 6 is a cross-section through the line 12 12 of Fig. 1. Fig. 7 is a cross-section through the line 13 13 of Fig. 1. Fig. 8 is a side view of the mandrel, and Fig. 9 is a section thereof on line 19 19 of Fig. 8.

Similar characters refer to similar parts throughout the several views.

One of the principal organs of the machine is the mandrel 14, consisting of a hollow cylinder slit on its whole length following a generating-line. This mandrel is fastened to the end of a shaft 15, the other end of which is provided with teeth, so as to form a pinion 16. Some of the teeth 16'—three, for instance—run through the whole length of the shaft. The pinion 16 is connected, by means of the gearings 17, 18, 19, 20, and 21, with the shaft 22, which receives its movement, through the instrumentality of bevel-gearings, from the impelling-shaft 24, bearing two pulleys 23 23, one of which is fixed on the shaft, while the other runs loose.

The mandrel 14 and the shaft 15 can move longitudinally in their respective bearings 25 and 26, and the shaft 15 is provided with a head 27, on which are pivoted the connecting-rods 28, which in turn are pivoted at their opposite ends on the connecting-rod 29, which latter is mounted on a pivot 30. The pivots of the head 27 are provided with rollers 31, running between the guide-bars 32 32, which latter are fastened in the slots 33$^a$ by bolts 33$^b$, which allow the bars to be adjusted vertically in position parallel to the frame of the machine, so that the said head and the shaft 15 are guided in their translating movement and are given a straight-line motion. The connecting-rod 29 is in operative relation, by means of the connecting-rod 35, with the connecting-rod 34, as clearly shown in Fig. 2. The connecting-rod 34 being hinged on a pivot 36 has a slot 37 wherein slides the pin 38 of the disk 39, mounted on a shaft 40, which latter can be acted on by the shaft 22, with which it is connected by means of the bevel-pinions 43 44 and by the intermittent straight gearing 41 42. The slot 37 of the connecting-rod 34 is circular in its part $a\ b\ c$, and its mean radius is equal to that of the distance from the center of disk 39 to the center of pin 38.

The mechanism on which the sheets of paper, cardboard, or pasteboard are placed consists of an oscillating table 46, held by the two pieces 47 and oscillating on the shaft 48. The oscillation is obtained by the action which the cam 50, mounted on the shaft 51, effects on the roller 49, Fig. 7. The shaft 51 is connected with the shaft 22 by means of straight gears and bevel-gears, which are mounted on the shafts 52 and 53. Two guides 54, placed on the table 46, and a butt-plate 55, the positions of which are adjustable, serve to receive and lead the sheets. A cylindric brush 56, with an open part $d\ e$, is mounted on a shaft 57, running parallel to the mandrel 14. This shaft 57 is connected, through the gearings 58, 59, and 60, with the shaft 53, as shown in Fig. 7. A curved pallet 61, placed underneath the brush 56, is fastened to the two vertical bars 62, tied together by the horizontal stay 63. These bars 62, sliding in the guides 64, which are fixed on the standards 65, receive their movement from the shaft 53 by a cam 66, acting on a roller 67 of the cranked lever 68, articulated on the pin 69. The glue is contained in a receptacle 70, arranged under the curved pallet 61, and the brush 56 is disposed in such a way that it constantly rubs on a horizontal bar 71.

Underneath the mandrel 14 is a bar 72, fastened on the supports 73, which oscillate on the pivot 74 through the action of the cams 75, mounted on the shaft 53.

A mechanism destined to receive the finished tubes is arranged under the table 46. This mechanism comprises a table 76, supported by two bars 77, sliding in the guides 78. The bars 77 receive their movement from the shaft 51 by means of the cams 79 and a set of levers 80 81, which are provided with springs 80' for the withdrawing movement, one end of each spring being secured to a fixed pin 80''.

All the devices heretofore described and the different organs put in movement by the same are fastened on a table 82, which rests on the standards or legs 83.

The arrangement of the machine being thus described, I shall now proceed to explain its working: When the sheet of paper, cardboard, or pasteboard is cut to the size desired, it is placed against the guides 54 of the table 46 at the moment when the latter is in the position shown by dotted lines in Fig. 7. Then the sheet is given the position required with regard to the mandrel 14 by making it butt against the butt-plate 55, which is suitably adjusted beforehand for this purpose. Now while the table 46 is lifted the mandrel 14 undergoes a movement of translation by being withdrawn from its position in front of the said table until its end $f$ is in a plane with the face $h$ of the support 25. This translating movement is imparted to the mandrel by the rotation of the disk 39, whose pin 38 moves in the slot 37 of the connecting-rod 34, and thereby makes the latter oscillate until the pin arrives at the initial point $c$ of the circular part $a\,b\,c$ of the slot and the center 45 of this part is in line with the center of the shaft 40. It will be easily understood that the oscillation of the connecting-rod 34 results in a translating movement of the mandrel 14, since the latter is connected with the same by means of the shaft 15, the head 27, and the swing formed of the articulated connecting-rods 28 29 35. As long as this translating movement lasts the mandrel 14 does not turn, because the intermittent wheels 20 and 21 are arranged in such a way that their inactive parts are in contact with each other while this movement is going on. It follows that the gearings 20 19 18 17 being at rest the pinion 16 does not turn either, while the teeth running through the whole length of the shaft 15, owing to an appropriate disposition of the same, gear with the teeth of the wheel 17, so that as long as the translation of the mandrel lasts any displacement of the wheels 17 18 19 is made impossible, whereby a good and secure working of the intermittent gearings 20 and 21 is obtained. On the other hand, the arrangement of the mechanism is such that the centers 45 and 40 are identical at the same moment when the end $f$ on the mandrel 14 is in a plane with the face $h$ of the support 25. At this moment the table 46 is lowered in a manner as to present the edge of the sheet to be worked on right in front of the slit of the mandrel 14. Meanwhile the pin 38 travels in the circular part $a\,b\,c$ of the slot 37 of the connecting-rod 34 which then occupies a position opposite to that shown in Fig. 2, yet it does not displace the connecting-rod 34 as long as its center and its radius are the same as that of the circular part $a\,b\,c$ of the slot or groove wherein it moves; but continuing its rotation it begins to move the articulated connecting rods and levers 34, 35, 29, and 28 in an opposite direction as soon as it reaches the point $a$ of the circular part $a\,b\,c$ of the said groove, and thereby replaces the mandrel 14 into its initial position. In its backward movement the mandrel 14 engages with its slit the edge of the sheet under operation, which sheet has been lowered with the table 46, as has been mentioned heretofore. The forward-and-backward movement of the mandrel 14 being terminated owing to the intermittent working of the pinions 41 and 42, the disk 39 ceases to turn, while the mandrel 14 now begins its rotation, thereby rolling the sheet engaged in its slit, and the brush 56, filled with glue in its part $e\,l\,m$ by the pallet 51, which draws the glue from the receptacle 70, glues the sheet which is pressed against the mandrel by the bar 72. When the rolling of the tube is effected, the bar 72 is lowered, while the tube is finished by the action of the dry part $m\,n\,d$ of the brush 56, which latter is freed from the glue wherewith it may be still filled by the friction exercised on its periphery by the bar 71. It remains now to take off the finished tube from the mandrel. This operation is effected in the following manner: The brush now presents its inactive part $d\,e$, Fig. 6. Now in the same time while the table 46 rises and the support 76 moves forward into the position shown by mixed lines in Fig. 6 the mandrel 14 is withdrawn for a new operation. As the finished tube butts with its one end against the face $h$ of the support 25 while the mandrel enters into the hollow shaft 16, the tube glides from the mandrel and is dropped on the support 76, so as to prevent it from falling into the receptacle 70, whereafter the support 76 returns to its initial position. In the meantime the operator places another sheet of paper, cardboard, or pasteboard on the lifted table, and therewith begins a new cycle of operation, to be accomplished under the same conditions as heretofore described.

In order to assure a continuous working of the machine, it is therefore sufficient to place on the table 46 one after another the sheets cut up beforehand to the length desired for the tubes to be manufactured.

What I claim as my invention, and desire to secure by Letters Patent, is—

1. In a machine for manufacturing cylindrical tubes of paper, cardboard or pasteboard, the combination of an oscillating table 46, cams 49, 50, a hollow cylindrical mandrel 14 with a slit on a generating-line, a shaft 15, a pinion 16 at one end several teeth of which run through its whole length, a series of gearings 17, 18, 19, 20, 21 of which 20, 21 are intermittent, a principal shaft 22, a driving-shaft 24, and fixed and loose running pulleys 23, 23, thereon.

2. In a machine for manufacturing cylindrical paper tubes, the combination of a shaft 15, a head 27, rollers 31, 31 therefor, horizontal guides for the rollers, stationary supports 33, 33 on which the guides are mounted, a series of articulated connecting-rods 28, 28, 29, 35, 34, and means suitably moving rod 34 on its pivot.

3. In a machine for manufacturing cylindrical paper tubes, the combination of a mandrel, a pinion-shaft 15 in line with and connected with the mandrel, an articulated connecting-rod 34 having a slot or groove 37 with a circular part $a\ b\ c$, a pin which travels in said groove, a disk 39, shaft 40 therefor, an intermittent gearing 41, 42, and a gearing 43, 44.

4. In a machine for manufacturing cylindrical paper tubes, the combination of a mandrel, means for operating it, a brush 56, a shaft 57 therefor, the mandrel parallel to said shaft, a curved pallet 61, bars supporting the pallet, a stay 63, guides 64, the stationary bearings 65, a cranked and articulated lever 68, a roller 67, a cam 66 mounted on shaft 53, a receptacle 70 for glue placed underneath the brush and the said curved pallet, a horizontal friction-bar 71 acting on the periphery of the said brush, a pressure-bar 72 mounted on two articulated supports 73, 73, cams 60, 60, and shaft 53 on which the cams are mounted.

5. In a machine for manufacturing cylindrical paper tubes, the combination of a table 76, supports 77, guides 78, cams 79, 79, articulated levers 80, 81, and springs therefor.

Signed at Rheims, France, this 26th day of May, 1900.

CHARLES FREROT.

Witnesses:
GUÉROLD,
A. DOME.